US012285050B2

(12) United States Patent
Milligan et al.

(10) Patent No.: US 12,285,050 B2
(45) Date of Patent: Apr. 29, 2025

(54) RESONANT CIRCUIT FOR AN AEROSOL GENERATING SYSTEM

(71) Applicant: NICOVENTURES TRADING LIMITED, London (GB)

(72) Inventors: Terrence Milligan, Madison, WI (US); Thomas Paul Blandino, Madison, WI (US); Anton Korus, London (GB); Patrick Moloney, London (GB); Walid Abi Aoun, London (GB)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 17/250,741

(22) PCT Filed: Aug. 30, 2019

(86) PCT No.: PCT/US2019/049076
§ 371 (c)(1),
(2) Date: Feb. 26, 2021

(87) PCT Pub. No.: WO2020/047417
PCT Pub. Date: Mar. 5, 2020

(65) Prior Publication Data
US 2021/0186109 A1 Jun. 24, 2021

(30) Foreign Application Priority Data
Aug. 31, 2018 (GB) .................................... 1814202

(51) Int. Cl.
*A24F 40/465* (2020.01)
*A24F 40/53* (2020.01)
(Continued)

(52) U.S. Cl.
CPC ............ *A24F 40/465* (2020.01); *A24F 40/53* (2020.01); *A24F 40/57* (2020.01); *H05B 6/108* (2013.01)

(58) Field of Classification Search
CPC ........ A24F 40/465; A24F 40/53; A24F 40/57; A24F 40/50; A24F 40/30; H05B 6/108;
(Continued)

(56) References Cited

U.S. PATENT DOCUMENTS

2015/0157756 A1 6/2015 Duffield et al.
2017/0202266 A1* 7/2017 Sur ...................... A61M 11/041
(Continued)

FOREIGN PATENT DOCUMENTS

IT RM20120193 A1 8/2012
WO 2015177043 A1 11/2015
(Continued)

OTHER PUBLICATIONS

International Search Report and Written Opinion of International Application No. PCT/US2019/049076, mailed on Dec. 18, 2019.

*Primary Examiner* — Truc T Nguyen
(74) *Attorney, Agent, or Firm* — BURR & FORMAN LLP

(57) ABSTRACT

A resonant circuit for an aerosol generating system includes an inductive element for inductively heating a susceptor arrangement to heat an aerosol generating material to thereby generate an aerosol. The circuit also includes a switching arrangement that, in use, alternates between a first state and a second state to enable a varying current to be generated from a DC voltage supply and flow through the inductive element to cause inductive heating of the susceptor arrangement. The switching arrangement is configured to alternate between the first state and the second state in response to voltage oscillations within the resonant circuit
(Continued)

which operate at a resonant frequency of the resonant circuit, whereby the varying current is maintained at the resonant frequency of the resonant circuit.

29 Claims, 5 Drawing Sheets

(51) Int. Cl.
*A24F 40/57* (2020.01)
*H05B 6/10* (2006.01)

(58) Field of Classification Search
CPC ........ H05B 1/0202; H05B 6/06; H05B 6/105; H05B 6/36
See application file for complete search history.

(56) References Cited

U.S. PATENT DOCUMENTS

| | | | | |
|---|---|---|---|---|
| 2018/0214645 | A1 | 8/2018 | Reevell | |
| 2019/0174823 | A1* | 6/2019 | Sur | A24F 40/50 |
| 2019/0200677 | A1* | 7/2019 | Chong | A61M 15/0021 |
| 2019/0274354 | A1* | 9/2019 | Sur | H05B 1/0244 |
| 2022/0225680 | A1* | 7/2022 | Lopez | A24D 1/20 |
| 2023/0309622 | A1* | 10/2023 | Moon | A24F 40/57 |
| 2023/0346031 | A1* | 11/2023 | Moloney | A24F 40/50 |
| 2024/0016219 | A1* | 1/2024 | Vintola | H05B 6/105 |

FOREIGN PATENT DOCUMENTS

| | | | |
|---|---|---|---|
| WO | 2015177256 | A1 | 11/2015 |
| WO | 2017085242 | A1 | 5/2017 |
| WO | 2018073376 | A1 | 4/2018 |

* cited by examiner

RESONANT CIRCUIT FOR AN AEROSOL GENERATING SYSTEM

PRIORITY CLAIM

The present application is a National Phase entry of PCT Application No. PCT/US2019/049076, filed Aug. 30, 2019, which claims priority from GB Application No. 1814202.6 filed Aug. 31, 2019, each of which is hereby fully incorporated herein by reference.

TECHNICAL FIELD

The present disclosure relates to a resonant circuit for an aerosol generating system, more specifically a resonant circuit for inductively heating a susceptor arrangement to generate an aerosol.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present disclosure, there is provided a resonant circuit for an aerosol generating system, the resonant circuit comprising: an inductive element for inductively heating a susceptor arrangement to heat an aerosol generating material to thereby generate an aerosol; and a switching arrangement that, in use, alternates between a first state and a second state to enable a varying current to be generated from a DC voltage supply and flow through the inductive element to cause inductive heating of the susceptor arrangement; wherein the switching arrangement is configured to alternate between the first state and the second state in response to voltage oscillations within the resonant circuit which operate at a resonant frequency of the resonant circuit, whereby the varying current is maintained at the resonant frequency of the resonant circuit.

The resonant circuit may be an LC circuit comprising the inductive element and a capacitive element.

The inductive element and the capacitive element may be arranged in parallel and the voltage oscillations may be voltage oscillations across the inductive element and the capacitive element.

The switching arrangement may comprise a first transistor and a second transistor, arranged such that, when the switching arrangement is in the first state the first transistor is OFF and the second transistor is ON and when the switching arrangement is in the second state the first transistor is ON and the second transistor is OFF.

The first transistor and the second transistor may each comprise a first terminal for turning that transistor ON and OFF, a second terminal and a third terminal, and the switching arrangement may be configured such that first transistor is adapted to switch from ON to OFF when the voltage at the second terminal of the second transistor is equal to or below a switching threshold voltage of the first transistor.

The first transistor and the second transistor may each comprise a first terminal for turning that transistor ON and OFF, a second terminal and a third terminal, and the switching arrangement may be configured such that second transistor is adapted to switch from ON to OFF when the voltage at the second terminal of the first transistor is equal to or below a switching threshold voltage of the second transistor.

The resonant circuit may further comprise a first diode and a second diode and the first terminal of the first transistor may be connected to the second terminal of the second transistor via the first diode, and the first terminal of the second transistor may be connected to the second terminal of the first transistor via the second diode, whereby the first terminal of the first transistor is clamped at low voltage when the second transistor is ON and the first terminal of the second transistor is clamped at low voltage when the first transistor is ON.

The first diode and/or the second diode may be Schottky diodes.

The switching arrangement may be configured such that first transistor is adapted to switch from ON to OFF when the voltage at the second terminal of the second transistor is equal to or below a switching threshold voltage of the first transistor plus a bias voltage of the first diode.

The switching arrangement may be configured such that second transistor is adapted to switch from ON to OFF when the voltage at the second terminal of the first transistor is equal to or below a switching threshold voltage of the second transistor plus a bias voltage of the second diode.

The first transistor and the second transistor may each comprise a first terminal for turning that transistor ON and OFF, a second terminal and a third terminal, and the circuit may further comprise a third transistor and a fourth transistor. The first terminal of the first transistor may be connected to the second terminal of the second transistor via the third transistor and the first terminal of the second transistor may be connected to the second terminal of the first transistor via the fourth transistor. The third and fourth transistors may be field effect transistors.

Each of the third transistor and the fourth transistor may have a first terminal for turning that transistor ON and OFF, and each of the third transistor and the fourth transistor may be configured to be switched ON when a voltage greater than or equal to a threshold voltage is applied to its respective first terminal.

The resonant circuit may be configured to be activated by the application of a voltage greater than or equal to the threshold voltage to the first terminals of both the third transistor and the fourth transistor to thereby turn the third and fourth transistor ON.

In some examples, the resonant circuit does not comprise a controller configured to actuate the switching arrangement.

The resonant frequency of the resonant circuit may change in response to energy being transferred from the inductive element to the susceptor arrangement.

The resonant circuit may comprise a transistor control voltage for supplying a control voltage to the first terminals of the first transistor and the second transistor.

The resonant circuit may comprise a first pull-up resistor connected in series between the first terminal of the first transistor and the transistor control voltage and a second pull-up resistor connected in series between the first terminal of the second transistor and the transistor control voltage.

The third transistor may be connected between the control voltage and the first terminal of the first transistor and the fourth transistor may be connected between the control voltage and the second transistor.

The first transistor and/or the second transistor may be field effect transistors.

A first terminal of the DC voltage supply may be connected to first and second points in the resonant circuit wherein the first point and the second point are electrically located to either side of the inductive element.

A first terminal of the DC voltage supply may be connected to a first point in the resonant circuit wherein the first point is electrically connected to a central point of the inductive element such that current flowing from the first point can flow in a first direction through a first portion of the inductive element and in a second direction through a second portion of the inductive element.

The resonant circuit may comprise at least one choke inductor positioned between the DC voltage supply and the inductive element.

The resonant circuit may comprise a first choke inductor and a second choke inductor wherein the first choke inductor is connected in series between the first point and the inductive element and the second choke is connected in series between the second point and the inductive element.

The resonant circuit may comprise a first choke inductor, wherein the first choke inductor is connected in series between the first point in the resonant circuit and the central point of the inductive element.

According to a second aspect of the present disclosure there is provided an aerosol generating device comprising the resonant circuit according to the first aspect.

The aerosol generating device may be configured to receive a first consumable component having a first susceptor arrangement and the aerosol generating device may be configured to receive a second consumable component having a second susceptor arrangement, wherein the varying current is maintained at a first resonant frequency of the resonant circuit when the first consumable component is coupled to the device and at a second resonant frequency of the resonant circuit when the second consumable component is coupled to the device.

The aerosol generating device may comprise a receiving portion, the receiving portion configured to receive either one of the first consumable component or the second consumable component such that the first or second susceptor arrangement is provided in proximity to the inductive element.

The inductive element may be an electrically conductive coil, wherein the device is configured to receive at least a part of the first or second susceptor arrangement within the coil.

According to a third aspect of the present disclosure there is provided a system comprising an aerosol generating device according to the second aspect and a susceptor arrangement.

The susceptor arrangement may be formed of aluminum.

The susceptor arrangement may be arranged in a consumable comprising the susceptor arrangement and aerosol generating material.

According to a fourth aspect of the present disclosure there is provided a kit of parts comprising a first consumable component comprising a first aerosol generating material and a first susceptor arrangement, and a second consumable component comprising a second aerosol generating material and a second susceptor, the first and second consumable components configured for use with the aerosol generating device according to the second aspect.

The first consumable component may have a different shape compared to the second consumable component.

The first susceptor arrangement may have a different shape or be formed from a different material compared to the second consumable component.

The first and second consumable components may be selected from the group comprising: a stick, a pod, a cartomizer, and a flat sheet.

The first susceptor arrangement or the second susceptor arrangement may be formed of aluminum.

DETAILED DESCRIPTION OF THE DRAWINGS

Figure 1:
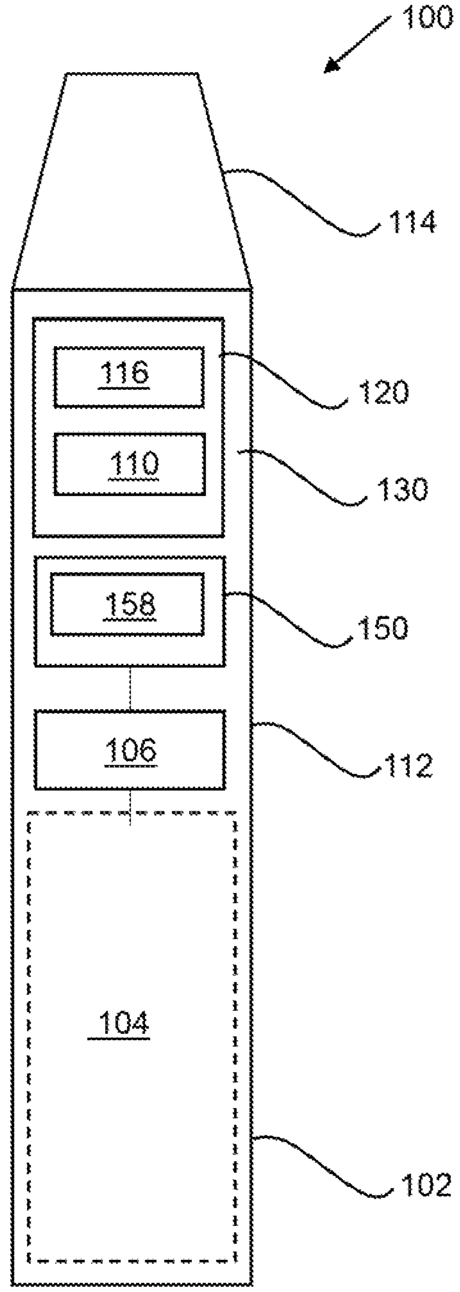
FIG. 1 illustrates schematically an aerosol generating device according to an example.

Induction heating is a process of heating an electrically conducting object (or susceptor) by electromagnetic induction. An induction heater may comprise an inductive element, for example, an inductive coil and a device for passing a varying electric current, such as an alternating electric current, through the inductive element. The varying electric current in the inductive element produces a varying magnetic field. The varying magnetic field penetrates a susceptor suitably positioned with respect to the inductive element, generating eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an LC circuit, having an inductance L provided by an induction element, for example the electromagnet which may be arranged to inductively heat a susceptor, and a capacitance C provided by a capacitor. The circuit may in some cases be represented as an RLC circuit, comprising a resistance R provided by a resistor. In some cases, resistance is provided by the ohmic resistance of parts of the circuit connecting the inductor and the capacitor, and hence the circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other.

One example of a circuit exhibiting electrical resonance is an LC circuit, comprising an inductor, a capacitor, and optionally a resistor. One example of an LC circuit is a series circuit where the inductor and capacitor are connected in series. Another example of an LC circuit is a parallel LC circuit where the inductor and capacitor are connected in parallel. Resonance occurs in an LC circuit because the collapsing magnetic field of the inductor generates an electric current in its windings that charges the capacitor, while the discharging capacitor provides an electric current that builds the magnetic field in the inductor. The present disclosure focuses on parallel LC circuits. When a parallel LC circuit is driven at the resonant frequency, the dynamic impedance of the circuit is at maximum (as the reactance of the inductor equals the reactance of the capacitor), and circuit current is at a minimum. However, for a parallel LC circuit, the parallel inductor and capacitor loop acts as a current multiplier (effectively multiplying the current within the loop and thus the current passing through the inductor). Driving the RLC or LC circuit at or near the resonant frequency may therefore provide for effective and/or efficient inductive heating by providing for the greatest value of the magnetic field penetrating the susceptor.

A transistor is a semiconductor device for switching electronic signals. A transistor typically comprises at least three terminals for connection to an electronic circuit. In some prior art examples, an alternating current may be supplied to a circuit using a transistor by supplying a drive signal which causes the transistor to switch at a predetermined frequency, for example at the resonant frequency of the circuit.

A field effect transistor (FET) is a transistor in which the effect of an applied electric field may be used to vary the effective conductance of the transistor. The field effect transistor may comprise a body B, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be OFF (i.e. substantially prevent current from passing therethrough) when there is substantially zero gate G to source S voltage, and may be turned ON (i.e. substantially allow current to pass therethrough) when there is a substantially non-zero gate G-source S voltage.

An n-channel (or n-type) field effect transistor (n-FET) is a field effect transistor whose channel comprises an n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

A p-channel (or p-type) field effect transistor (p-FET) is a field effect transistor whose channel comprises a p-type semiconductor, where holes are the majority carriers and electrons are the minority carriers. For example, p-type semiconductors may comprise an intrinsic semiconductor (such as silicon for example) doped with acceptor impurities (such as boron for example). In p-channel FETs, the source terminal S is placed at a higher potential than the drain terminal D (i.e. there is a negative drain-source voltage, or in other words a positive source-drain voltage). In order to turn a p-channel FET "on" (i.e. to allow current to pass therethrough), a switching potential is applied to the gate terminal G that is lower than the potential at the source terminal S (and which may for example be higher than the potential at the drain terminal D).

A metal-oxide-semiconductor field effect transistor (MOSFET) is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor". However, in other examples, the gate may be made from other materials than metal, such as polysilicon, and/or the insulating layer may be made from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. As another example, a MOSFET may be a p-channel (or p-type) MOSFET, where the semiconductor is p-type. The p-channel MOSFET (p-MOSFET) may be operated in the same way as described above for the p-channel FET. An n-MOSFET typically has a lower source-drain resistance than that of a p-MOSFET. Hence in an "on" state (i.e. where current is passing therethrough), n-MOSFETs generate less heat as compared to p-MOSFETs, and hence may waste less energy in operation than p-MOSFETs. Further, n-MOSFETs typically have shorter switching times (i.e. a characteristic response time from changing the switching potential provided to the gate terminal G to the MOSFET changing whether or not current passes therethrough) as compared to p-MOSFETs. This can allow for higher switching rates and improved switching control.

FIG. 1 illustrates schematically an aerosol generating device 100, according to an example. The aerosol generating device 100 comprises a DC power source 104, in this example a battery 104, a circuit 150 comprising an inductive element 158, a susceptor arrangement 110, and aerosol generating material 116.

In the example of FIG. 1, the susceptor arrangement 110 is located within a consumable 120 along with the aerosol generating material 116. The DC power source 104 is electrically connected to the circuit 150 and is arranged to provide DC electrical power to the circuit 150. The device 100 also comprises control circuitry 106, in this example the circuit 150 is connected to the battery 104 via the control circuitry 106.

The control circuitry 106 may comprise means for switching the device 100 on and off, for example in response to a user input. The control circuitry 106 may for example comprise a puff detector (not shown), as is known per se, and/or may take user input via at least one button or touch control (not shown). The control circuitry 106 may comprise means for monitoring the temperature of components of the device 100 or components of a consumable 120 inserted in the device. In addition to the inductive element 158, the circuit 150 comprises other components which are described below.

The inductive element 158 may be, for example a coil, which may for example be planar. The inductive element 158 may, for example, be formed from copper (which has a relatively low resistivity). The circuitry 150 is arranged to convert an input DC current from the DC power source 104 into a varying, for example alternating, current through the inductive element 158. The circuitry 150 is arranged to drive the varying current through the inductive element 158.

The susceptor arrangement 110 is arranged relative to the inductive element 158 for inductive energy transfer from the inductive element 158 to the susceptor arrangement 110. The susceptor arrangement 110 may be formed from any suitable material that can be inductively heated, for example a metal or metal alloy, e.g., steel. In some implementations, the susceptor arrangement 110 may comprise or be entirely formed from a ferromagnetic material, which may comprise one or a combination of example metals such as iron, nickel and cobalt. In some implementations, the susceptor arrangement 110 may comprise or be formed entirely from a non-ferromagnetic material, for example aluminum. The inductive element 158, having varying current driven therethrough, causes the susceptor arrangement 110 to heat up by Joule heating and/or by magnetic hysteresis heating, as described above. The susceptor arrangement 110 is arranged to heat the aerosol generating material 116, for example by conduction, convection, and/or radiation heating, to generate an aerosol in use. In some examples, the susceptor arrangement 110 and the aerosol generating material 116 form an integral unit that may be inserted and/or removed from the aerosol generating device 100, and may be disposable. In some examples, the inductive element 158 may be removable from the device 100, for example for replacement. The aerosol generating device 100 may be hand-held. The aerosol generating device 100 may be arranged to heat the aerosol generating material 116 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenzied tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 100 comprises an outer body 112 housing the DC power supply 104, the control circuitry 106 and the circuit 150 comprising the inductive element 158. The consumable 120 comprising the susceptor arrangement 110 and the aerosol generating material 116 in this example is also inserted into the body 112 to configure the device 100 for use. The outer body 112 comprises a mouthpiece 114 to allow aerosol generated in use to exit the device 100.

In use, a user may activate, for example via a button (not shown) or a puff detector (not shown), the circuitry 106 to cause a varying, e.g. alternating, current to be driven through the inductive element 108, thereby inductively heating the susceptor arrangement 110, which in turn heats the aerosol generating material 116, and causes the aerosol generating material 116 thereby to generate an aerosol. The aerosol is generated into air drawn into the device 100 from an air inlet (not shown), and is thereby carried to the mouthpiece 104, where the aerosol exits the device 100 for inhalation by a user.

The circuit 150 comprising the inductive element 158, and the susceptor arrangement 110 and/or the device 100 as a whole may be arranged to heat the aerosol generating material 116 to a range of temperatures to volatilize at least one component of the aerosol generating material 116 without combusting the aerosol generating material. For example, the temperature range may be about 50° C. to about 350° C., such as between about 50° C. and about 300° C., between about 100° C. and about 300° C., between about 150° C. and about 300° C., between about 100° C. and about 200° C., between about 200° C. and about 300° C., or between about 150° C. and about 250° C. In some examples, the temperature range is between about 170° C. and about 250° C. In some examples, the temperature range may be other than this range, and the upper limit of the temperature range may be greater than 300° C.

It will be appreciated that there may be a difference between the temperature of the susceptor arrangement 110 and the temperature of the aerosol generating material 116, for example during heating up of the susceptor arrangement 110, for example where the rate of heating is large. It will therefore be appreciated that in some examples the temperature at which the susceptor arrangement 110 is heated to may, for example, be higher than the temperature to which it is desired that the aerosol generating material 116 is heated.

Figure 2:
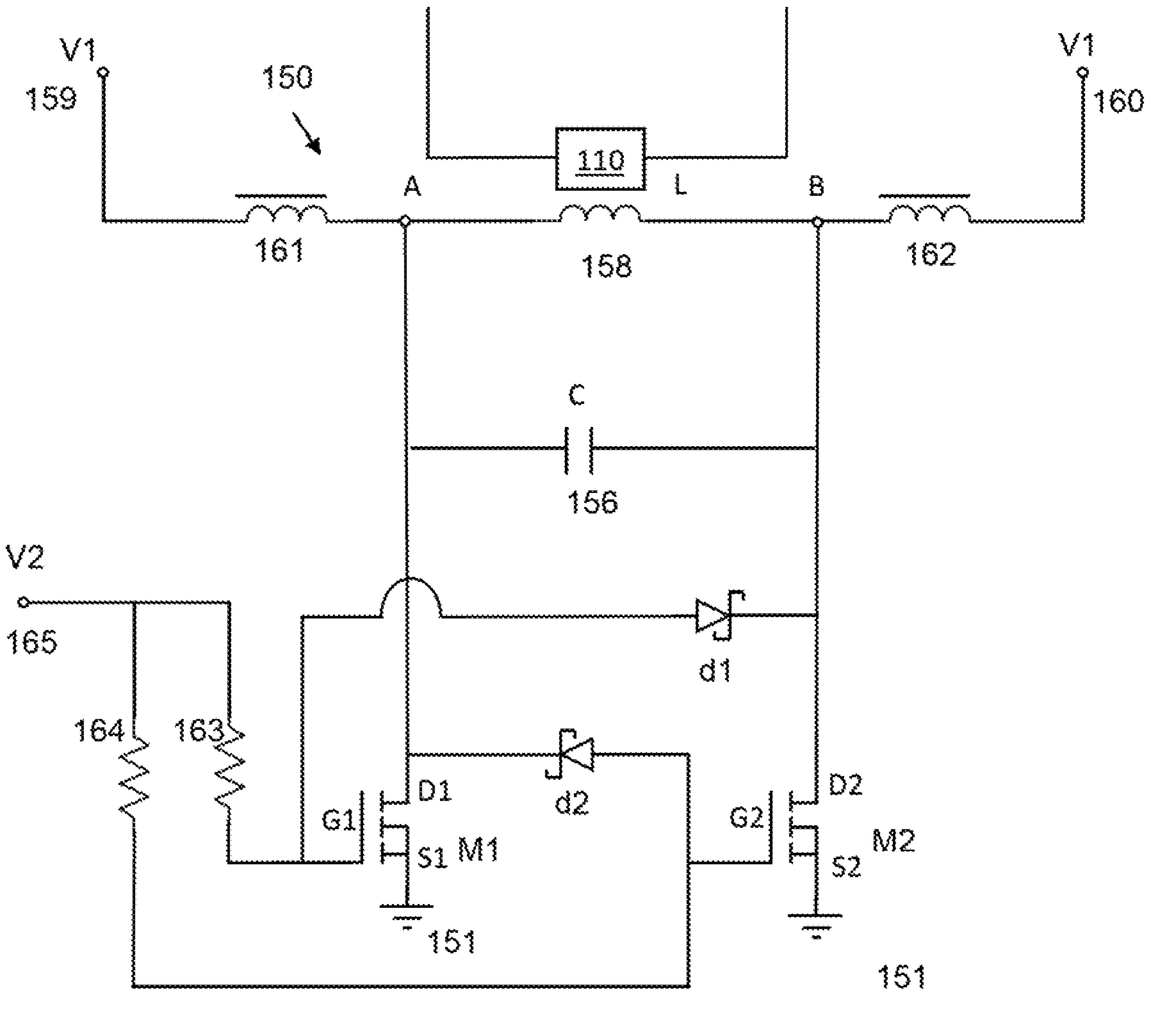
FIG. 2 illustrates schematically a resonant circuit according to an example.

Referring now to FIG. 2, there is illustrated an example circuit 150, which is a resonant circuit, for inductive heating of the susceptor arrangement 110. The resonant circuit 150 comprises the inductive element 158 and a capacitor 156, connected in parallel.

The resonant circuit 150 comprises a switching arrangement M1, M2 which, in this example, comprises a first transistor M1 and a second transistor M2. The first transistor M1 and the second transistor M2 each comprise a respective first terminal G1, G2, second terminal D1, D2 and third terminal S1, S2. The second terminals D1, D2 of the first transistor M1 and the second transistor M2 are connected to either side of the parallel inductive element 158 and the capacitor 156 combination, as will be explained in more detail below. The third terminals S1, S2 of the first transistor M1 and the second transistor M2 are each connected to earth 151. In the example illustrated in FIG. 2 the first transistor M1 and the second transistor M2 are both MOSFETS and the first terminals G1, G2 are gate terminals, the second terminals D1, D2 are drain terminals and the third terminals S1, S2 are source terminals.

It will be appreciated that in alternative examples other types of transistors may be used in place of the MOSFETs described above.

The resonance circuit 150 has an inductance L and a capacitance C. The inductance L of the resonant circuit 150 is provided by the inductive element 158, and may also be affected by an inductance of the susceptor arrangement 110 which is arranged for inductive heating by the inductive element 158. The inductive heating of the susceptor arrangement 110 is via a varying magnetic field generated by the inductive element 158, which, in the manner described above, induces Joule heating and/or magnetic hysteresis losses in the susceptor arrangement 110. A portion of the inductance L of the resonant circuit 150 may be due to the magnetic permeability of the susceptor arrangement 110. The varying magnetic field generated by the inductive element 158 is generated by a varying, for example alternating, current flowing through the inductive element 158.

The inductive element 158 may, for example, be in the form of a coiled conductive element. For example, inductive element 158 may be a copper coil. The inductive element 158 may comprise, for example, a multi-stranded wire, such as Litz wire, for example a wire comprising a number of individually insulated wires twisted together. The AC resistance of a multi-stranded wire is a function of frequency and the multi-stranded wire can be configured in such a way that the power absorption of the inductive element is reduced at a driving frequency. As another example, the inductive element 158 may be a coiled track on a printed circuit board, for example. Using a coiled track on a printed circuit board may be useful as it provides for a rigid and self-supporting track, with a cross section which obviates any requirement for multi-strand wire (which may be expensive), which can be mass produced with a high reproducibility for low cost. Although one inductive element 158 is shown, it will be readily appreciated that there may be more than one inductive element 158 arranged for inductive heating of one or more susceptor arrangements 110.

The capacitance C of the resonant circuit 150 is provided by the capacitor 156. The capacitor 156 may be, for example, a Class 1 ceramic capacitor, for example a COG type capacitor. The total capacitance C may also comprise the stray capacitance of the resonant circuit 150; however, this is or can be made negligible compared with the capacitance provided by the capacitor 156.

The resistance of the resonant circuit 150 is not shown in FIG. 2 but it should be appreciated that a resistance of the circuit may be provided by the resistance of the track or wire connecting the components of the resonance circuit 150, the resistance of the inductor 158, and/or the resistance to current flowing through the resonance circuit 150 provided by the susceptor arrangement 110 arranged for energy transfer with the inductor 158. In some examples, one or more dedicated resistors (not shown) may be included in the resonant circuit 150.

The resonant circuit 150 is supplied with a DC supply voltage V1 provided from the DC power source 104 (see FIG. 1), e.g. from a battery. A positive terminal of the DC voltage supply V1 is connected to the resonant circuit 150 at a first point 159 and at a second point 160. A negative terminal (not shown) of the DC voltage supply V1 is connected to earth 151 and hence, in this example, to the source terminals S of both the MOSFETs M1 and M2. In examples, the DC supply voltage V1 may be supplied to the resonant circuit directly from a battery or via an intermediary element.

The resonant circuit 150 may therefore be considered to be connected as an electrical bridge with the inductive element 158 and the capacitor 156 in parallel connected between the two arms of the bridge. The resonant circuit 150 acts to produce a switching effect, described below, which results in a varying, e.g. alternating, current being drawn through the inductive element 158, thus creating the alternating magnetic field and heating the susceptor arrangement 110.

The first point 159 is connected to a first node A located at a first side of the parallel combination of the inductive element 158 and the capacitor 156. The second point 160 is connected to a second node B, to a second side of the parallel combination of the inductive element 158 and the capacitor 156. A first choke inductor 161 is connected in series between the first point 159 and the first node A, and a second choke inductor 162 is connected in series between the second point 160 and the second node B. The first and second chokes 161 and 162 act to filter out AC frequencies from entering the circuit from the first point 159 and the second point 160 respectively but allow DC current to be drawn into and through the inductor 158. The chokes 161 and 162 allow the voltage at A and B to oscillate with little or no visible effects at the first point 159 or the second point 160.

In this particular example, the first MOSFET M1 and the second MOSFET M2 are n-channel enhancement mode MOSFETs. The drain terminal of the first MOSFET M1 is connected to the first node A via a conducting wire or the like, while the drain terminal of the second MOSFET M2 is connected to the second node B, via a conducting wire or the like. The source terminal of each MOSFET M1, M2 is connected to earth 151.

The resonant circuit 150 comprises a second voltage source V2, gate voltage supply (or sometimes referred to herein as a control voltage), with its positive terminal connected at a third point 165 which is used for supplying a voltage to the gate terminals G1, G2 of the first and second MOSFETs M1 and M2. The control voltage V2 supplied at the third point 165 in this example is independent of voltage V1 supplied at the first and second points 159, 160, which enables variation of voltage V1 without impacting the control voltage V2. A first pull-up resistor 163 is connected between the third point 165 and the gate terminal G1 of the first MOSFET M1. A second pull-up resistor 164 is connected between the third point 165 and the gate terminal G2 of the second MOSFET M2.

In other examples, a different type of transistor may be used, such as a different type of FET. It will be appreciated that the switching effect described below can be equally achieved for a different type of transistor which is capable of switching from an "on" state to an "off" state. The values and polarities of the supply voltages V1 and V2 may be chosen in conjunction with the properties of the transistor used, and the other components in the circuit. For example, the supply voltages may be chosen in dependence on whether an n-channel or p-channel transistor is used, or in dependence on the configuration in which the transistor is connected, or the difference in the potential difference applied across terminals of the transistor which results in the transistor being in either on or off.

The resonant circuit 150 further comprises a first diode d1 and a second diode d2, which in this example are Schottky diodes, but in other examples any other suitable type of diode may be used. The gate terminal G1 of the first MOSFET M1 is connected to the drain terminal D2 of the second MOSFET M2 via the first diode d1, with the forward direction of the first diode d1 being towards the drain D2 of the second MOSFET M2.

The gate terminal G2 of the second MOSFET M2 is connected to the drain D1 of the first second MOSFET M1 via the second diode d2, with the forward direction of the second diode d2 being towards the drain D1 of the first MOSFET M1. The first and second Schottky diodes d1 and d2 may have a diode threshold voltage of around 0.3V. In other examples, silicon diodes may be used having a diode threshold voltage of around 0.7V. In examples, the type of diode used is selected in conjunction with the gate threshold voltage, to allow desired switching of the MOSFETs M1 and M2. It will be appreciated that the type of diode and gate supply voltage V2 may also be chosen in conjunction with the values of pull-up resistors 163 and 164, as well as the other components of the resonant circuit 150.

The resonant circuit 150 supports a current through the inductive element 158 which is a varying current due to switching of the first and second MOSFETs M1 and M2. Since, in this example the MOSFETs M1 and M2 are enhancement mode MOSFETS, when a voltage applied at the gate terminal G1, G2 of one of the first and second MOSFETs is such that a gate-source voltage is higher than a predetermined threshold for that MOSFET, the MOSFET is turned to the ON state. Current may then flow from the drain terminal D1, D2 to the source terminal S1, S2 which is connected to ground 151. The series resistance of the MOSFET in this ON state is negligible for the purposes of the operation of the circuit, and the drain terminal D can be considered to be at ground potential when the MOSFET is in the ON state. The gate-source threshold for the MOSFET may be any suitable value for the resonant circuit 150 and it will be appreciated that the magnitude of the voltage V2 and resistances of resistors 164 and 163 are chosen dependent on the gate-source threshold voltage of the MOSFETs M1 and M2, essentially so that voltage V2 is greater than the gate threshold voltage(s).

The switching procedure of the resonant circuit 150 which results in varying current flowing through the inductive element 158 will now be described starting from a condition where the voltage at first node A is high and the voltage at the second node B is low.

When the voltage at node A is high, the voltage at the drain terminal D1 of the first MOSFET M1 is also high because the drain terminal D1 of M1 is connected, directly in this example, to the node A via a conducting wire. At the same time the voltage at the node B is held low and the voltage at the drain terminal D2 of the second MOSFET M2 is correspondingly low (the drain terminal of M2 being, in this example, directly connected to the node B via a conducting wire).

Accordingly, at this time, the value of the drain voltage of M1 is high and is greater than the gate voltage of M2. The second diode d2 is therefore reverse-biased at this time. The gate voltage of M2 at this time is greater than the source terminal voltage of M2, and the voltage V2 is such that the gate-source voltage at M2 is greater than the ON threshold for the MOSFET M2. M2 is therefore ON at this time.

At the same time, the drain voltage of M2 is low, and the first diode d1 is forward biased due to the gate voltage supply V2 to the gate terminal of M1. The gate terminal of M1 is therefore connected via the forward biased first diode d1 to the low voltage drain terminal of the second MOSFET M2, and the gate voltage of M1 is therefore also low. In other words, because M2 is on, it is acting as a ground clamp, which results in the first diode d1 being forward biased, and the gate voltage of M1 being low. As such, the gate-source voltage of M1 is below the ON threshold and the first MOSFET M1 is OFF.

In summary, at this point the circuit 150 is in a first state, wherein:

voltage at node A is high;
voltage at node B is low;
first diode d1 is forward biased;
second MOSFET M2 is ON;
second diode d2 is reverse biased; and
first MOSFET M1 is OFF.

From this point, with the second MOSFET M2 being in the ON state, and the first MOSFET M1 being in the OFF state, current is drawn from the supply V1 through the first choke 161 and through the inductive element 158. Due to the presence of inducting choke 161, the voltage at node A is free to oscillate. Since the inductive element 158 is in parallel with the capacitor 156, the observed voltage at node A follows that of a half sinusoidal voltage profile. The frequency of the observed voltage at node A is equal to the resonant frequency $f_0$ of the circuit 150.

The voltage at node A reduces sinusoidally in time from its maximum value towards 0 as a result of an energy decay at node A. The voltage at node B is held low (because MOSFET M2 is on) and the inductor L is charged from the DC supply V1. The MOSFET M2 is switched off at a point in time when the voltage at node A is equal to or below the gate threshold voltage of M2 plus the forward bias voltage of d2. When the voltage at node A has finally reached zero, the MOSFET M2 will be fully off.

At the same time, or shortly after, the voltage at node B is taken high. This happens due to the resonant transfer of energy between the inductive element 158 and the capacitor 156. When the voltage at node B becomes high due to this resonant transfer of energy, the situation described above with respect to the nodes A and B and the MOSFETs M1 and M2 is reversed. That is, as the voltage at A reduces towards zero, the drain voltage of M1 is reduced. The drain voltage of M1 reduces to a point where the second diode d2 is no longer reverse biased and becomes forward biased. Similarly, the voltage at node B rises to its maximum and the first diode d1 switches from being forward biased to being reverse biased. As this happens, the gate voltage of M1 is no longer coupled to the drain voltage of M2 and the gate voltage of M1 therefore becomes high, under the application of gate supply voltage V2. The first MOSFET M1 is therefore switched to the ON state, since its gate-source voltage is now above the threshold for switch-on. As the gate terminal of M2 is now connected via the forward biased second diode d2 to the low voltage drain terminal of M1, the gate voltage of M2 is low. M2 is therefore switched to the OFF state.

In summary, at this point the circuit 150 is in a second state, wherein:

voltage at node A is low;
voltage at node B is high;
first diode d1 is reverse biased;
second MOSFET M2 is OFF;
second diode d2 is forward biased; and
first MOSFET M1 is ON.

At this point, current is drawn through the inductive element 158 from the supply voltage V1 through the second choke 162. The direction of the current has therefore reversed due to the switching operation of the resonant circuit 150. The resonant circuit 150 will continue to switch between the above-described first state in which the first MOSFET M1 is OFF and the second MOSFET M2 is ON, and the above-described second state in which the first MOSFET M1 is ON and the second MOSFET M2 is OFF.

In the steady state of operation, energy is transferred between the electrostatic domain (i.e., in the capacitor 156) and the magnetic domain (i.e., the inductor 158), and vice versa.

The net switching effect is in response to the voltage oscillations in the resonant circuit 150 where we have an energy transfer between the electrostatic domain (i.e., in the capacitor 156) and the magnetic domain (i.e., the inductor 158), thus creating a time varying current in the parallel LC circuitry, which varies at the resonant frequency of the circuit. This is advantageous for energy transfer between the inductive element 158 and the susceptor arrangement 110 since the circuitry 150 operates at its optimal efficiency level and therefore achieves more efficient heating of the aerosol generating material 116 compared to circuitry operating off resonance. The described switching arrangement is advantageous as it allows the circuit 150 to drive itself at the resonant frequency under varying load conditions, for example when a different susceptor is coupled to the inductive element. What this means is that in the event that the properties of the circuitry 150 change (for example if the susceptor 110 is present or not, or if the temperature of the susceptor changes, or even physical movement of the susceptor element 110), the dynamic nature of the circuitry 150 continuously adapts its resonant point to transfer energy in an optimal fashion, thus meaning that the circuitry 150 is always driven at resonance. Moreover, the configuration of the circuit 150 is such that no external controller or the like is required to apply the control voltage signals to the gates of the MOSFETS to effect the switching.

In examples described above, with reference to FIG. 2, the gate terminals G1, G2 are supplied with a gate voltage via a second power supply which is different to the power supply for the source voltage V1. However, in some examples, the gate terminals may be supplied with the same voltage supply as the source voltage V1. In such examples, the first point 159, second point 160, and third point 165 in the circuit 150 may, for example, be connected to the same power rail. In such examples, it will be appreciated that the properties of the components of the circuit must be chosen to allow the described switching action to take place. For example, the gate supply voltage and diode threshold voltages should be chosen such that the oscillations of the circuit trigger switching of the MOSFETs at the appropriate level. The provision of separate voltage values for the gate supply voltage V2 and the source voltage V1 allows for the source voltage V1 to be varied independently of the gate supply voltage V2 without affecting the operation of the switching mechanism of the circuit.

The resonant frequency $f_0$ of the circuit 150 may be in the MHz range, for example in the range 0.5 MHz to 4 MHz, for example in the range 2 MHz to 3 MHz. It will be appreciated that the resonant frequency $f_0$ of the resonant circuit 150 is dependent on the inductance L and capacitance C of the circuit 150, as set out above, which in turn is dependent on the inductive element 158, capacitor 156 and additionally the susceptor arrangement 110. That is, it can be considered that the resonant frequency changes in response to energy being transferred from the inductive element to the susceptor arrangement. As such, the resonant frequency $f_0$ of the circuit 150 can vary from implementation to implementation. For example, the frequency may be in the range 0.1 MHz to 4 MHz, or in the range of 0.5 MHz to 2 MHz, or in the range 0.3 MHz to 1.2 MHz. In other examples, the resonant frequency may be in a range different from those described above. Generally, the resonant frequency will depend on the characteristics of the circuitry, such as the electrical and/or physical properties of the components used, including the susceptor arrangement 110.

It will also be appreciated that the properties of the resonant circuit 150 may be selected based on other factors for a given susceptor arrangement 110. For example, in order to improve the transfer of energy from the inductive element 158 to the susceptor arrangement 110, it may be useful to select the skin depth (i.e. the depth from the surface of the susceptor arrangement 110 within which current density falls by a factor of 1/e, which is at least a function of frequency) based on the material properties of the susceptor arrangement 110. The skin depth differs for different materials of susceptor arrangements 110, and reduces with increasing drive frequency. On the other hand, for example, in order to reduce the proportion of power supplied to the resonant circuit 150 and/or driving element 102 that is lost as heat within the electronics, it may be beneficial to have a circuit which drives itself at relatively lower frequencies. Since the drive frequency is equal to the resonant frequency in this example, the considerations here with respect to drive frequency are made with respect to obtaining the appropriate resonant frequency, for example by designing a susceptor arrangement 110 and/or using a capacitor 156 with a certain capacitance and an inductive element 158 with a certain inductance. In some examples, a compromise between these factors may therefore be chosen as appropriate and/or desired.

The resonant circuit 150 of FIG. 2 has a resonant frequency $f_0$ at which the current I is minimized and the dynamic resistance is maximized. The resonant circuit 150 drives itself at this resonant frequency and therefore the oscillating magnetic field generated by the inductor 158 is maximum, and the inductive heating of the susceptor arrangement 110 by the inductive element 158 is maximized.

In some examples, inductive heating of the susceptor arrangement 110 by the resonant circuit 150 may be controlled by controlling the supply voltage provided to the resonant circuit 150, which in turn may control the current flowing in the resonant circuit 150, and hence may control the energy transferred to the susceptor arrangement 110 by the resonant circuit 150, and hence the degree to which the susceptor arrangement 110 is heated. In other examples, it will be appreciated that the temperature of the susceptor arrangement 110 may be monitored and controlled by, for example, changing the voltage supply (e.g., by changing the magnitude of the voltage supplied or by changing the duty cycle of a pulse width modulated voltage signal) to the inductive element 158 depending on whether the susceptor arrangement 110 is to be heated to a greater or lesser degree.

As mentioned above, the inductance L of the resonant circuit 150 is provided by the inductive element 158 arranged for inductive heating of the susceptor arrangement 110. At least a portion of the inductance L of resonant circuit 150 is due to the magnetic permeability of the susceptor arrangement 110. The inductance L, and hence resonant frequency $f_0$ of the resonant circuit 150 may therefore depend on the specific susceptor(s) used and its positioning relative to the inductive element(s) 158, which may change from time to time. Further, the magnetic permeability of the susceptor arrangement 110 may vary with varying temperatures of the susceptor 110.

Figure 3:
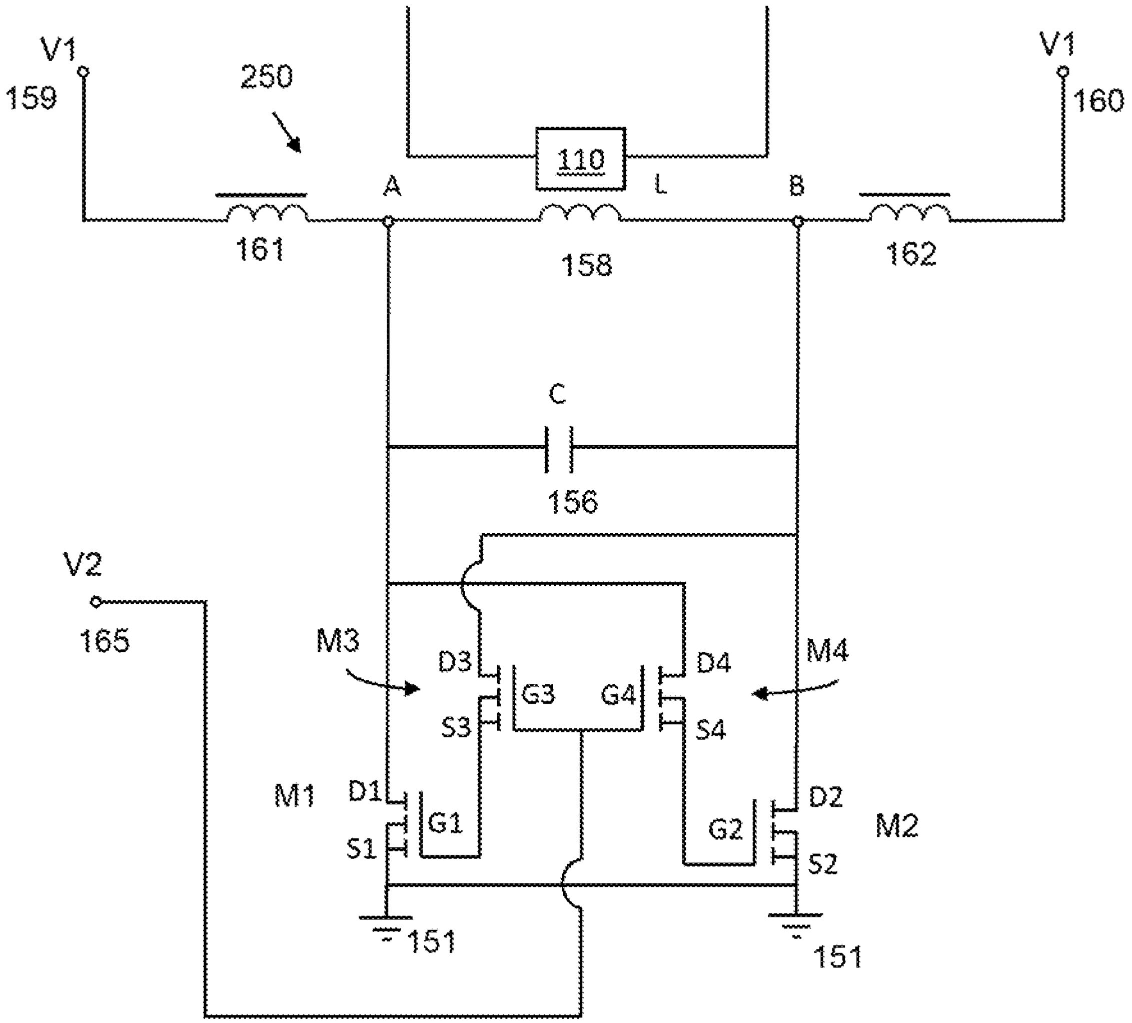
FIG. 3 illustrates schematically a resonant circuit according to a second example.

FIG. 3 shows a second example of a resonant circuit 250. The second resonant circuit 250 comprises many of the same components as the resonant circuit 150 and like components in each of the resonant circuits 150 250 are provided with the same reference numerals and will not be described in detail again.

The second circuit 250 differs from the first circuit 150 in that the second circuit 250 does not comprise the diodes d1, d2, via which the gate terminals G1, G2 of each of the transistors M1, M2 are respectively connected to the drain terminals D1, D2 of the other of the transistors M1, M2. Instead of the diodes d1, d2 which are included in the first circuit 150, the second circuit 250 comprises a third MOSFET M3 and a fourth MOSFET M4.

In the second circuit 250, the gate G1 of the first MOSFET M1 is connected to the drain D2 of the second MOSFET M2 via the third MOSFET M3. The gate G2 of the second MOSFET M2 is similarly connected to the drain D1 of the first MOSFET M1 via a fourth MOSFET M4. The control voltage V2 is supplied from the point 165 to gate terminals G3, G4 of both the third MOSFET M3 and the fourth MOSFET M4. In an example, such as the example represented by FIG. 3, the gate terminals G3, G4 of the third MOSFET M3 and the fourth MOSFET M4 are connected to one another via an electrical conductor, for example an electrical track, and the voltage V2 supplied to a point on the electrical conductor. It will be appreciated that each of the third MOSFET M3 and the fourth MOSFET M4 has a gate threshold voltage such that when a voltage greater than the threshold voltage is applied to its gate terminal G3, G4, the respective MOSFET M3, M4 is turned "on" such that current may flow from its drain terminal to its source terminal. In examples, the voltage V2 is greater than the threshold voltages of the third and fourth MOSFETs M3, M4 such that applying the control voltage V2 turns the third and fourth MOSFETs M3, M4 to the ON state. In an example, the threshold voltage of the third MOSFET M3 is equal to the threshold voltage of the fourth MOSFET M4. In some examples, the second circuit 250 may comprise one of more pull-down resistors (not shown in FIG. 3) connected between the gates G1, G2 of the first and second MOSFETs M1, M2 and ground.

The second circuit 250 operates as a self-oscillating circuit which causes a varying current to flow through the inductive element 158 in the manner described with reference to the first example circuit 150 with reference to FIG. 2. Differences in the behavior of the second circuit 250 from that of the first example circuit 150 due to the use of MOSFETs M3, M4 rather than diodes d1, d2, will become apparent from the following description.

The switching procedure of the second circuit 250 which results in a varying current flowing through the inductive element 158 will now be described.

When the voltage V2 is applied to the gates G3, G4 of the third and fourth MOSFETs M3, M4, the third and fourth MOSFETs are turned "on". Providing that a voltage V1, at this point, each of the first, second, third and fourth MOSFETs M1-M4 is in the ON state. At this point, the voltages at nodes A and B start to fall. Certain imbalances may exist in the circuit 250, for example differences in resistance between the MOSFETs M1-M4, or the properties of the values of inductors present in the circuit. These imbalances act such that the voltage at one of the nodes A or B begins to fall faster than the voltage at the other of these nodes A, B. The MOSFET M1, M2 corresponding to the node A, B at which the voltage falls fastest will remain in the ON state. The other of the MOSFETS M1, M2, corresponding with the other of nodes A, B is switched to the OFF state. The following describes the situation wherein the voltage at node A begins oscillating and the voltage at the node B remains at zero. However, equally, it may be the case that it is the voltage at the node B which begins oscillating while the voltage at node A remains at zero volts.

When the voltage at node A rises, the voltage at the drain terminal D1 of the first MOSFET M1 also rises because the drain terminal D1 of first MOSFET M1 is connected to the node A via a conducting wire. At the same time, the voltage at the node B is held low and the voltage at the drain terminal D2 of the second MOSFET M2 is correspondingly low (the drain terminal D2 of the second MOSFET M2 being, in this example, directly connected to the node B via a conducting wire).

As the voltage at the node A and the drain D1 of the first MOSFET M1 rises, the voltage at the gate G2 of the second MOSFET M2 rises. This is due to the drain D1 being connected via the fourth MOSFET M4 to the gate G2 of the second MOSFET M2 and the fourth MOSFET M4 being "on" due to the voltage V2 being applied to its gate terminal G4.

As the voltage at the drain D1 of the first MOSFET M1 rises, the voltage at the gate G2 of the second MOSFET M2 continues to rise until it reaches a maximum voltage value $V_{max}$. The maximum voltage value $V_{max}$ reached at the gate G2 of the second MOSFET M2 is dependent on the control voltage V2 and the gate-source voltage of the fourth MOSFET M4 ($V_{gsM4}$). The maximum value $V_{max}$ may be expressed as $V_{max}=V2-V_{gsM4}$.

After a half cycle of oscillation at the resonant frequency of the circuit 250, the voltage at the drain D1 of the first MOSFET M1 begins decreasing. The voltage at the drain D1 of the first MOSFET M1 decreases until it reaches 0V. At this point, the first MOSFET M1 turns from "off" to "on" and the second MOSFET M2 turns from "on" to "off".

The circuit then continues to oscillate in a similar manner as described above, except with the node A remaining at zero volts while the node B is free to oscillate. That is, the voltage at the drain D2 of the second MOSFET M2 and at the node B then begins rising, while the voltage at the drain D1 of the first MOSFET M1 and the node A remains at zero.

As the voltage at the node B and the drain D2 of the second MOSFET M2 rises, the voltage at the gate G1 of the first MOSFET M1 rises since the drain D2 is connected via the third MOSFET M3 to the gate G1 of the first MOSFET M1 and the third MOSFET M3 is "on" due to the voltage V2 being applied to its gate terminal G3.

As the voltage at the drain D2 of the second MOSFET M2 rises, the voltage at the gate G1 of the first MOSFET M1 continues to rise until it reaches a maximum voltage value $V_{max}$. The maximum voltage value $V_{max}$ reached at the gate G1 is dependent on the control voltage V2 and the gate-source voltage of the third MOSFET M3 ($V_{gsM3}$). The maximum value $V_{max}$ may be expressed as $V_{max}=V2-V_{gsM3}$. In this example, the gate-source voltages of the third and fourth MOSFETs M3, M4 are equal to one another, i.e. $V_{gsM3}=V_{gsM4}$.

After a half cycle of oscillation at the resonant frequency of the second circuit 250, the voltage at the drain D2 of the second MOSFET M2 begins decreasing. The voltage at the drain D2 of the second MOSFET M2 decreases until it reaches 0V. At this point, the second MOSFET M2 turns from "off" to "on" and the first MOSFET M1 turns from "on" to "off".

In the manner described with reference to the first example circuit 150, when the second MOSFET M2 is in the ON state, and the first MOSFET M1 is in the OFF state, current is drawn from the supply V1 through the first choke 161 and through the inductive element 158. When the first MOSFET M1 is in the ON state, and the second MOSFET M2 is in the OFF state, current is drawn from the supply V1 through the second choke 162 and through the inductive element 158. The second example circuit 250 therefore oscillates in the same manner as described for the first example circuit 150 of FIG. 2, with the direction of the current reversing with each switching operation of the circuit 250.

The use of third and fourth MOSFETs M3, M4, in some examples, may be advantageous because it may allow for lower energy losses. That is, the first example circuit 150 may result in resistive losses due to some current draw through the pull-up resistors 163, 164 to ground 151. For example, when the first MOSFET M1 is in the ON state, the second diode d2 is forward biased and thus a small current may be drawn through the second pull-up resistor 164, resulting in resistive losses. Similarly, when the second MOSFET M2 is in the ON state, there may be resistive losses due to current drawn through the first pull-up resistor 163. The second example circuit in examples may omit the resistors 163, 164. The second example circuit 250 may reduce such losses by substituting the pull-up resistors 163, 164 and the diodes d1, d2 for third and fourth MOSFETs M3, M4. For example, in the second example circuit 250, when the first MOSFET M1 is in the OFF state the current drawn through the third MOSFET M3 may be essentially zero. Similarly, in the second example circuit 250, when the second MOSFET M2 is in the OFF state the current drawn through the fourth MOSFET M4 may be essentially zero. Thus, resistive losses may be reduced by use of the arrangement shown in the second circuit 250. Further, energy may be required to charge and discharge the gates G1, G2 of first MOSFET M1 and second MOSFET M2. The second circuit 250 may provide for this energy to be effectively provided from the nodes A and B.

Example circuits above have been described comprising two choke inductors 161, 162. In another example, an example inductive heating circuit may comprise only one choke inductor. In such an example circuit, the inductor coil 158 may be "center-tapped".

Figure 4:
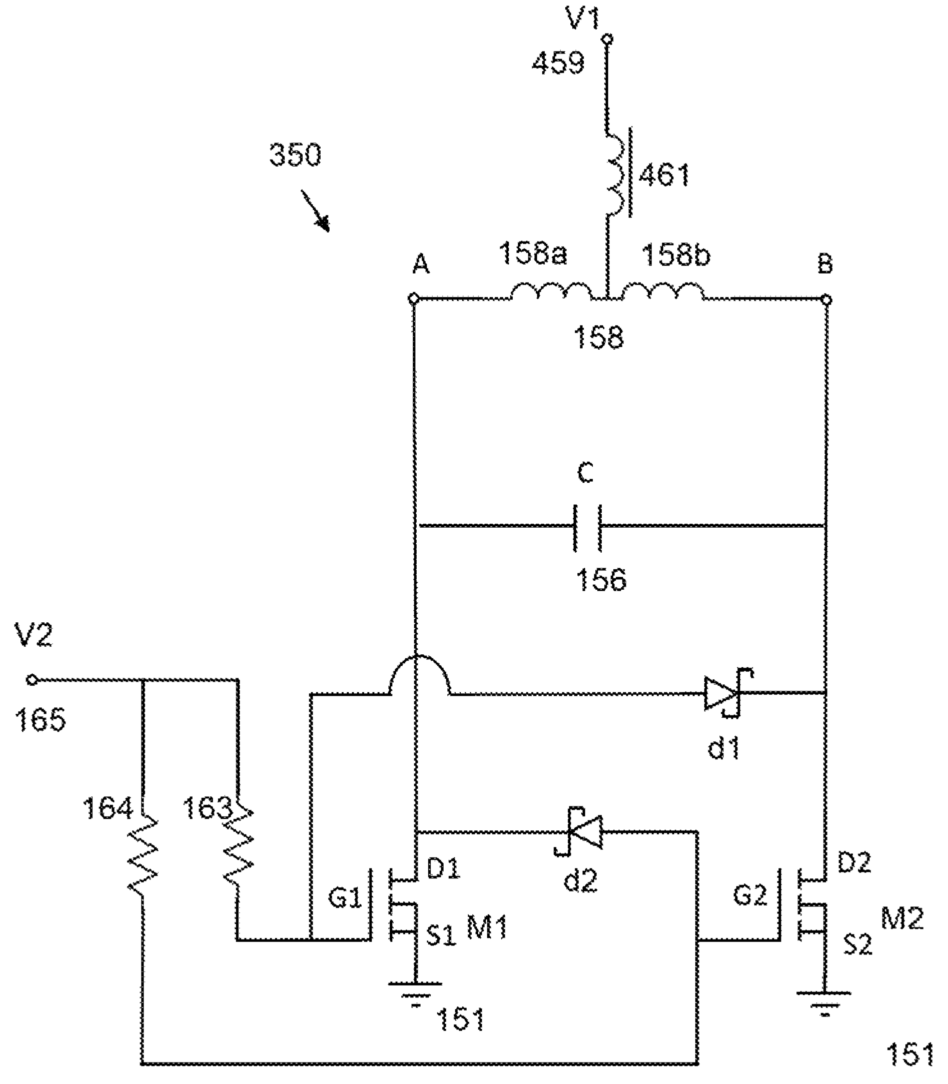
FIG. 4 illustrates schematically a resonant circuit according to a third example.

FIG. 4 shows a third example circuit 350 which is a variation on the first example circuit 150 and in which the coil 158 is a center-tapped coil and a single choke inductor 461 replaces the first and second choke inductors 161, 162. The susceptor 110 is omitted from FIG. 4 for clarity purposes. Again, components that are the same as those in the circuit 150 illustrated in FIG. 2 are given the same reference numerals in FIG. 4 as they are in FIG. 1.

In the third circuit 350, voltage V1 is applied via the choke inductor 461 to a center of the inductor coil 158, at a single point 459 as opposed to at first and second points 159, 160 in the first example circuit 150. Rather than, as in the first and second example circuits 150, 250, current being drawn alternately through the first choke 161 and the second choke 162 as the current in the circuit changes direction due to the resonant oscillations of the circuit, current is drawn through the single choke inductor 461 and alternately drawn through a first part 158*a* of the inductor 158 and through a second part 158*b* of the inductor 158 as the current oscillations in the circuit 350 change direction due to the switching operation of the MOSFETs M1, M2. The third circuit 350 operates in an equivalent manner to the first circuit 150 in other respects.

Figure 5:
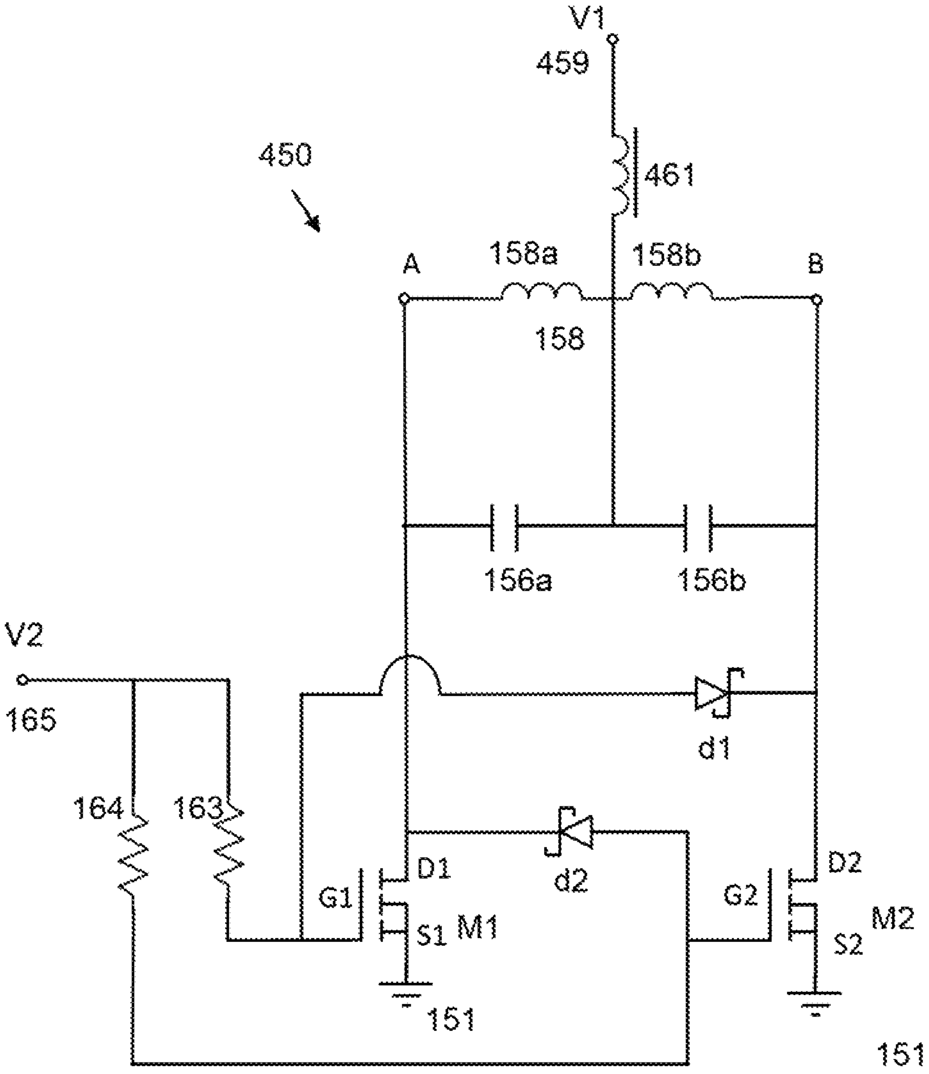
FIG. 5 illustrates schematically a resonant circuit according to a fourth example.

A fourth example circuit is shown in FIG. 5. Again, components that are the same as those in the circuit 150 illustrated in FIG. 2 are given the same reference numerals in FIG. 4 as they are in FIG. 1. The fourth circuit 450 differs from the third circuit 350 in that, rather than comprising the single capacitor 156 of the third circuit 350, the fourth circuit 450 is provided with a first capacitor 156*a* and a second capacitor 156*b*. The fourth circuit 450, similarly to the third circuit 350 comprises a center-tapped arrangement with the inductor comprising a first part 158*a* and a second part 158*b*. The voltage V1 is applied via the choke inductor 461 to a center of the inductor coil 158 (as in the arrangement of FIG. 4) and, further, the center of the inductor coil 158 is electrically connected to a point between the first capacitor 156*a* and the second capacitor 156*b*. Two adjacent circuit loops are therefore provided, one comprising the first inductor part 158*a* and the first capacitor 156*a* and the other comprising the second inductor part 158*b* and the second capacitor 156*b*. The fourth circuit 450 operates in an equivalent manner to the third circuit 350 in other respects.

The center-tapped arrangement described with reference to FIG. 4 and FIG. 5 can equally be applied in an arrangement which uses third and fourth MOSFETs instead of diodes, in the manner described with reference to FIG. 3. The use of a center-tapped arrangement may be advantageous since the number of parts required to assemble the circuit may be reduced. For example, the number of choke inductors may be reduced from two to one.

In examples described herein the susceptor arrangement 110 is contained within a consumable and is therefore replaceable. For example, the susceptor arrangement 110 may be disposable and for example integrated with the aerosol generating material 116 that it is arranged to heat. The resonant circuit 150 allows for the circuit to be driven at the resonance frequency, automatically accounting for differences in construction and/or material type between different susceptor arrangements 110, and/or differences in the placement of the susceptor arrangements 110 relative to the inductive element 158, as and when the susceptor arrangement 110 is replaced. Furthermore, the resonant circuit is configured to drive itself at resonance regardless of the specific inductive element 158, or indeed any other component of the resonant circuit 150 used. This is particularly useful to accommodate for variations in manufacturing both in terms of the susceptor arrangement 110 but also with regards to the other components of the circuit 150. For example, the resonant circuit 150 allows the circuit to remain driving itself at the resonant frequency regardless of the use of different inductive elements 158 with different values of inductance, and/or differences in the placement of the inductive element 158 relative to the susceptor arrangement 110. The circuit 150 is also able to drive itself at resonance even if the components are replaced over the lifetime of the device.

In some examples, the aerosol generating device 100 is configured to be usable with a plurality of different types of consumables each of which consumables comprises a different type of susceptor arrangement to the other consumables.

The different susceptor arrangements may be formed, for example, of different materials or be of different shapes or different sizes or different combinations of different materials or shapes or sizes.

In use, the resonant frequency of the circuit 150 is dependent upon the particular susceptor arrangement of whichever type of consumable is coupled to, for example inserted into, the device 100. However, the alternating frequency through the inductive element 158 of the resonant circuit, due to the self-oscillating arrangement of the circuit 150, is configured to self-adjust to match changes in the resonant frequency caused by the coupling of a different susceptor/consumable to the inductive element. Accordingly, the circuit is configured to heat a given susceptor arrangement at the resonant frequency of the circuit 150 when that consumable is coupled to the device 100, regardless of the properties of the susceptor arrangement or consumable.

In some examples, the aerosol generating device 100 is configured to receive a first consumable having a first susceptor arrangement and the device is also configured to receive a second consumable having a second susceptor arrangement that is different to the first susceptor arrangement.

For example, the device 100 may be configured to receive a first consumable comprising an aluminum susceptor of a particular size and also be configured to receive a second consumable comprising a steel susceptor, which may be of a different shape and/or size to the aluminum susceptor.

The varying current in the circuit 150 is maintained at a first resonant frequency of the resonant circuit 150 when the first consumable is coupled to the device and is maintained at a second resonant frequency of the resonant circuit when the second consumable is coupled to the device 100.

The aerosol generating device 100 in examples comprises a receiving portion for receiving a consumable. The receiving portion may be configured to receive a plurality of types of consumables, such as the first consumable or the second consumable. FIG. 1 shows the aerosol generating device 100 in receipt of a consumable 120, which is schematically shown to be received in a receiving portion 130 of the aerosol generating device 100. The receiving portion 130 may be a cavity or chamber in the body 112 of the device. When the consumable 120 is in the receiving portion 130, the susceptor arrangement 110 of the consumable 120 is arranged in proximity for inductive coupling and heating by the inductive element 158.

The device 100 may be configured to receive a plurality of different consumables of different shapes.

In examples, as mentioned above, the inductive element 158 is an electrically conductive coil. In such examples, at least a part of the susceptor arrangement of a consumable may be configured to be received within the coil. This may provide efficient inductive coupling between the susceptor arrangement and the inductive element and as such provide for efficient heating of the susceptor arrangement.

Operation of the aerosol generating device 100 comprising resonant circuit 150, will now be described, according to an example. Before the device 100 is turned on, the device 100 may be in an 'off' state, i.e. no current flows in the resonant circuit 150. The device 150 is switched to an 'on' state, for example by a user turning the device 100 on. Upon switching on of the device 100 the resonant circuit 150 begins drawing current from the voltage supply 104, with the current through the inductive element 158 varying at the resonant frequency $f_0$. The device 100 may remain in the on state until a further input is received by the controller 106, for example until the user no longer pushes the button (not shown), or the puff detector (not shown) is no longer activated, or until a maximum heating duration has elapsed. The resonant circuit 150 being driven at the resonant frequency $f_0$ causes an alternating current I to flow in the resonant circuit 150 and the inductive element 158, and hence for the susceptor arrangement 110 to be inductively heated. As the susceptor arrangement 110 is inductively heated, its temperature (and hence the temperature of the aerosol generating material 116) increases. In this example, the susceptor arrangement 110 (and aerosol generating material 116) is heated such that it reaches a steady temperature $T_{MAX}$. The temperature $T_{MAX}$ may be a temperature which is substantially at or above a temperature at which a substantial amount of aerosol is generated by the aerosol generating material 116. The temperature $T_{MAX}$ may be between around 200 and around 300° C. for example (although of course may be a different temperature depending on the material 116, susceptor arrangement 110, the arrangement of the overall device 100, and/or other requirements and/or conditions). The device 100 is therefore in a 'heating' state or mode, wherein the aerosol generating material 116 reaches a temperature at which aerosol is substantially being produced, or a substantial amount of aerosol is being produced. It should be appreciated that in most, if not all cases, as the temperature of the susceptor arrangement 110 changes, so too does the resonant frequency $f_0$ of the resonant circuit 150. This is because magnetic permeability of the susceptor arrangement 110 is a function of temperature and, as described above, the magnetic permeability of the susceptor arrangement 110 influences the coupling between the inductive element 158 and the susceptor arrangement 110, and hence the resonant frequency $f_0$ of the resonant circuit 150.

The present disclosure predominantly describes an LC parallel circuit arrangement. As mentioned above, for an LC parallel circuit at resonance, the impedance is maximum and the current is minimum. Note that the current being minimum generally refers to the current observed outside of the parallel LC loop, e.g., to the left of choke 161 or to the right of choke 162. Conversely, in a series LC circuit, current is at maximum and, generally speaking, a resistor is required to be inserted to limit the current to a safe value which can otherwise damage certain electrical components within the circuit. This generally reduces the efficiency of the circuit because energy is lost through the resistor. A parallel circuit operating at resonance does not require such restrictions.

In some examples, the susceptor arrangement 110 comprises or consists of aluminum. Aluminum is an example of a non-ferrous material and as such has a relative magnetic permeability close to one. What this means is that aluminum has a generally low degree of magnetization in response to an applied magnetic field. Hence, it has generally been considered difficult to inductively heat aluminum, particularly at low voltages such as those used in aerosol provision systems. It has also generally been found that driving circuitry at resonance frequency is advantageous as this provides optimum coupling between the inductive element 158 and susceptor arrangement 110. For aluminum, it is observed that a slight deviation from the resonant frequency causes a noticeable reduction in the inductive coupling between the susceptor arrangement 110 and the inductive element 158, and thus a noticeable reduction in the heating efficiency (in some cases to the extent where heating is no longer observed). As mentioned above, as the temperature of the susceptor arrangement 110 changes, so too does the resonant frequency of the circuit 150. Therefore, in the case where the susceptor arrangement 110 comprises or consists of a non-ferrous susceptor, such as aluminum, the resonant circuit 150 of the present disclosure is advantageous in that the circuitry is always driven at the resonant frequency (independent of any external control mechanism). This means that maximum inductive coupling and thus maximum heating efficiency is achieved at all times enabling aluminum to be efficiently heated. It has been found that a consumable including an aluminum susceptor can be heated efficiently when the consumable includes an aluminum wrap forming a closed electrical circuit and/or having a thickness of less than 50 microns.

In examples where the susceptor arrangement 110 forms part of a consumable, the consumable may take the form of that described in PCT/EP2016/070178, the entirety of which is incorporated herein by reference.

The above examples are to be understood as illustrative examples of the disclosure. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. An aerosol generating device comprising:

a resonant circuit for heating an aerosol generating material, the resonant circuit comprising:

an inductive element for inductively heating a susceptor arrangement to heat the aerosol generating material to thereby generate an aerosol, and a switching arrangement that, in use, alternates between a first state and a second state to enable a varying current to be generated from a DC voltage supply and flow through the inductive element to cause inductive heating of the susceptor arrangement;

wherein the switching arrangement is configured to alternate between the first state and the second state in response to voltage oscillations within the resonant circuit which operate at a resonant frequency of the resonant circuit, whereby the varying current is maintained at the resonant frequency of the resonant circuit;

the switching arrangement comprises a first transistor and a second transistor, and wherein, when the switching arrangement is in the first state the first transistor is OFF and the second transistor is ON and when the switching arrangement is in the second state the first transistor is ON and the second transistor is OFF; and the first transistor and the second transistor each comprise a first terminal for turning that transistor ON and OFF, a second terminal and a third terminal, and wherein the circuit further comprises a third transistor and a fourth transistor, and wherein the first terminal of the first transistor is connected to the second terminal of the second transistor via the third transistor and the first terminal of the second transistor is connected to the second terminal of the first transistor via the fourth transistor.

2. The aerosol generating device according to claim 1, wherein the resonant circuit is an LC circuit comprising the inductive element and a capacitive element.

3. The aerosol generating device according to claim 1, wherein the switching arrangement is configured such that the first transistor is adapted to switch from ON to OFF when a voltage at the second terminal of the second transistor is equal to or below a switching threshold voltage of the first transistor.

4. The aerosol generating device according to claim 1, wherein the switching arrangement is configured such that the second transistor is adapted to switch from ON to OFF when the voltage at the second terminal of the first transistor is equal to or below a switching threshold voltage of the second transistor.

5. The aerosol generating device according to claim 1, wherein each of the third transistor and the fourth transistor has a first terminal for turning that respective transistor ON and OFF, and wherein each of the third transistor and the fourth transistor is configured to be switched ON when a voltage greater than or equal to a threshold voltage is applied to its respective first terminal, and the third transistor and the fourth transistor are field effect transistors.

6. The aerosol generating device according to claim 1, wherein the resonant circuit does not comprise a controller configured to actuate the switching arrangement.

7. The aerosol generating device according to claim 1, wherein the resonant frequency of the resonant circuit changes in response to energy being transferred from the inductive element to the susceptor arrangement.

8. The aerosol generating device according to claim 1, wherein at least one of the first transistor or the second transistor is a field effect transistor.

9. The aerosol generating device according to claim 1, wherein a first terminal of the DC voltage supply is connected to a first point and a second point in the resonant circuit, and wherein the first point and the second point are electrically located on either side of the inductive element.

10. The aerosol generating device according to claim 1, wherein a first terminal of the DC voltage supply is connected to a first point in the resonant circuit, and wherein the first point is electrically connected to a central point of the inductive element such that current flowing from the first point can flow in a first direction through a first portion of the inductive element and in a second direction through a second portion of the inductive element.

11. The aerosol generating device according to claim 1, comprising at least one choke inductor positioned between the DC voltage supply and the inductive element.

12. The aerosol generating device according to claim 1, wherein the aerosol generating device is configured to receive a first consumable component having a first susceptor arrangement, and wherein the aerosol generating device is configured to receive a second consumable component having a second susceptor arrangement, and wherein the varying current is maintained at a first resonant frequency of the resonant circuit when the first consumable component is coupled to the aerosol generating device and at a second resonant frequency of the resonant circuit when the second consumable component is coupled to the aerosol generating device.

13. A system comprising the aerosol generating device according to claim 1 and the susceptor arrangement.

14. A kit of parts comprising a first consumable component comprising a first aerosol generating material and a first susceptor arrangement, and a second consumable component comprising a second aerosol generating material and a second susceptor, the first consumable component and the second consumable component configured for use with the aerosol generating device of claim 1.

15. The aerosol generating device according to claim 2, wherein the inductive element and the capacitive element are arranged in parallel and the voltage oscillations are voltage oscillations across the inductive element and the capacitive element.

16. The aerosol generating device according to claim 5, wherein the resonant circuit is configured to be activated by an application of a voltage greater than or equal to the threshold voltage to the first terminals of both the third transistor and the fourth transistor to thereby turn the third transistor and the fourth transistor ON.

17. The aerosol generating device according to claim 1, comprising a transistor control voltage for supplying a control voltage to the first terminals of the first transistor and the second transistor.

18. The aerosol generating device according to claim 17, comprising a first pull-up resistor connected in series between the first terminal of the first transistor and the transistor control voltage and a second pull-up resistor connected in series between the first terminal of the second transistor and the transistor control voltage.

19. The aerosol generating device according to claim 18, wherein the third transistor is connected between the control voltage and the first terminal of the first transistor and the fourth transistor is connected between the control voltage and the second transistor.

20. The aerosol generating device according to claim 11, wherein a first terminal of the DC voltage supply is connected to a first point and a second point in the resonant circuit, and wherein the first point and the second point are electrically located on either side of the inductive element, and further comprising a first choke inductor and a second choke inductor, wherein the first choke inductor is connected in series between the first point and the inductive element and the second choke is connected in series between the second point and the inductive element.

21. The aerosol generating device according to claim 11, wherein a first terminal of the DC voltage supply is connected to a first point in the resonant circuit, and wherein the first point is electrically connected to a central point of the inductive element such that current flowing from the first point can flow in a first direction through a first portion of the inductive element and in a second direction through a second portion of the inductive element, and further comprising a first choke inductor, wherein the first choke inductor is connected in series between the first point in the resonant circuit and the central point of the inductive element.

22. The aerosol generating device according to claim 12, wherein the aerosol generating device comprises a receiving portion, the receiving portion configured to receive either one of the first consumable component or the second consumable component such that the first susceptor arrangement or the second susceptor arrangement is provided in proximity to the inductive element.

23. The aerosol generating device according to claim 22, wherein the inductive element is an electrically conductive coil, and wherein the aerosol generating device is configured to receive at least a part of the first susceptor arrangement or the second susceptor arrangement within the electrically conductive coil.

24. The system according to claim 13, wherein the susceptor arrangement is formed of aluminum.

25. The system according to claim 13, wherein the susceptor arrangement is arranged in a consumable comprising the susceptor arrangement and the aerosol generating material.

26. The kit of parts according to claim 14, wherein the first consumable component has a different shape compared to the second consumable component.

27. The kit of parts according to claim 14, wherein the first susceptor arrangement has a different shape or is formed from a different material compared to the second consumable component.

28. The kit of parts according to claim 14, wherein the first consumable component and the second consumable component are selected from the group consisting of: a stick, a pod, a cartomizer, and a flat sheet.

29. The kit of parts according to claim 14, wherein the first susceptor arrangement or the second susceptor arrangement is formed of aluminum.

* * * * *